United States Patent Office 3,545,880
Patented Dec. 8, 1970

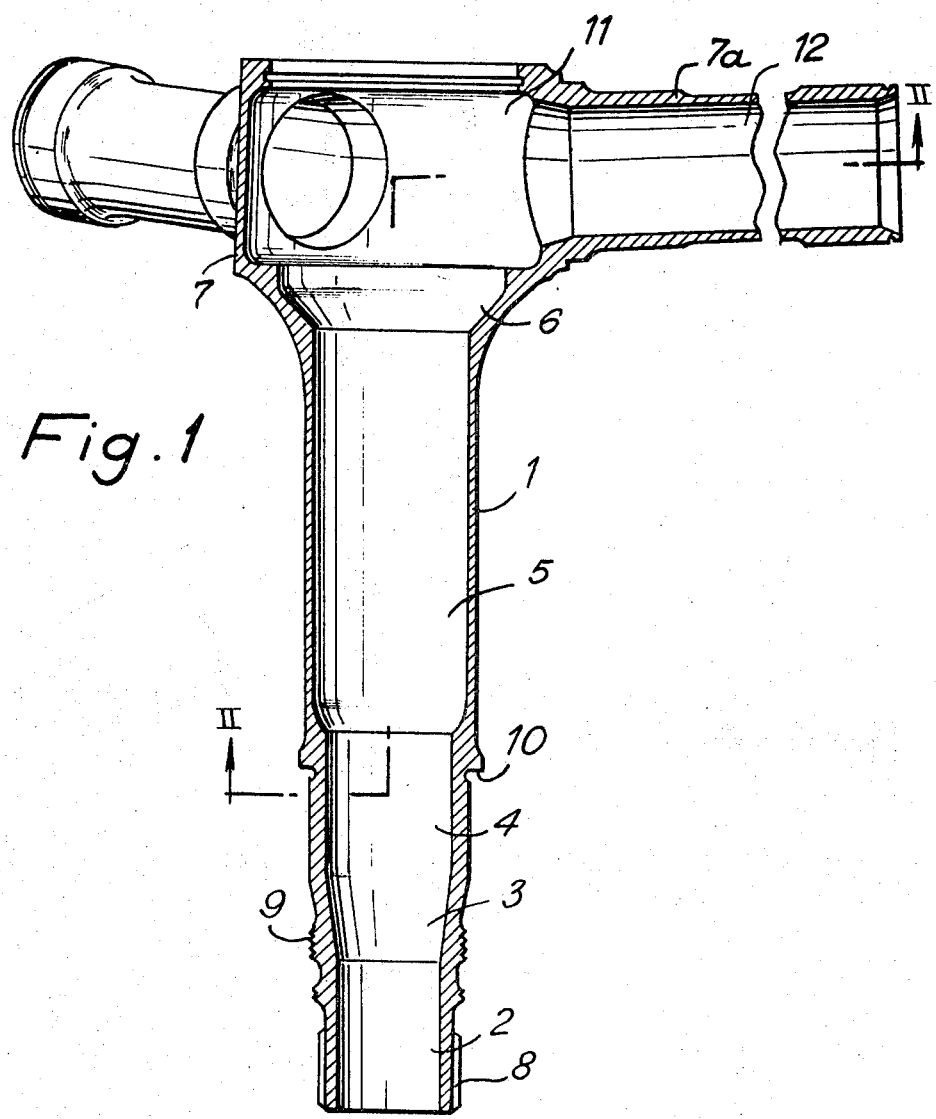
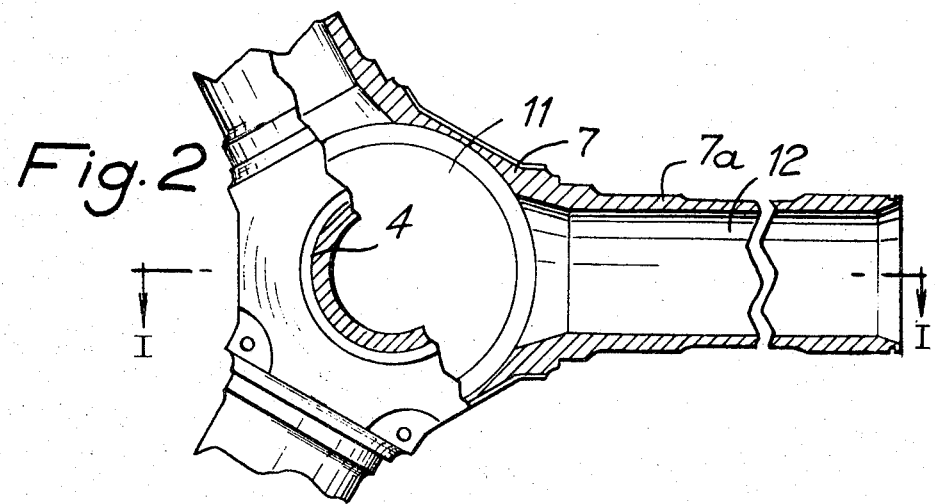

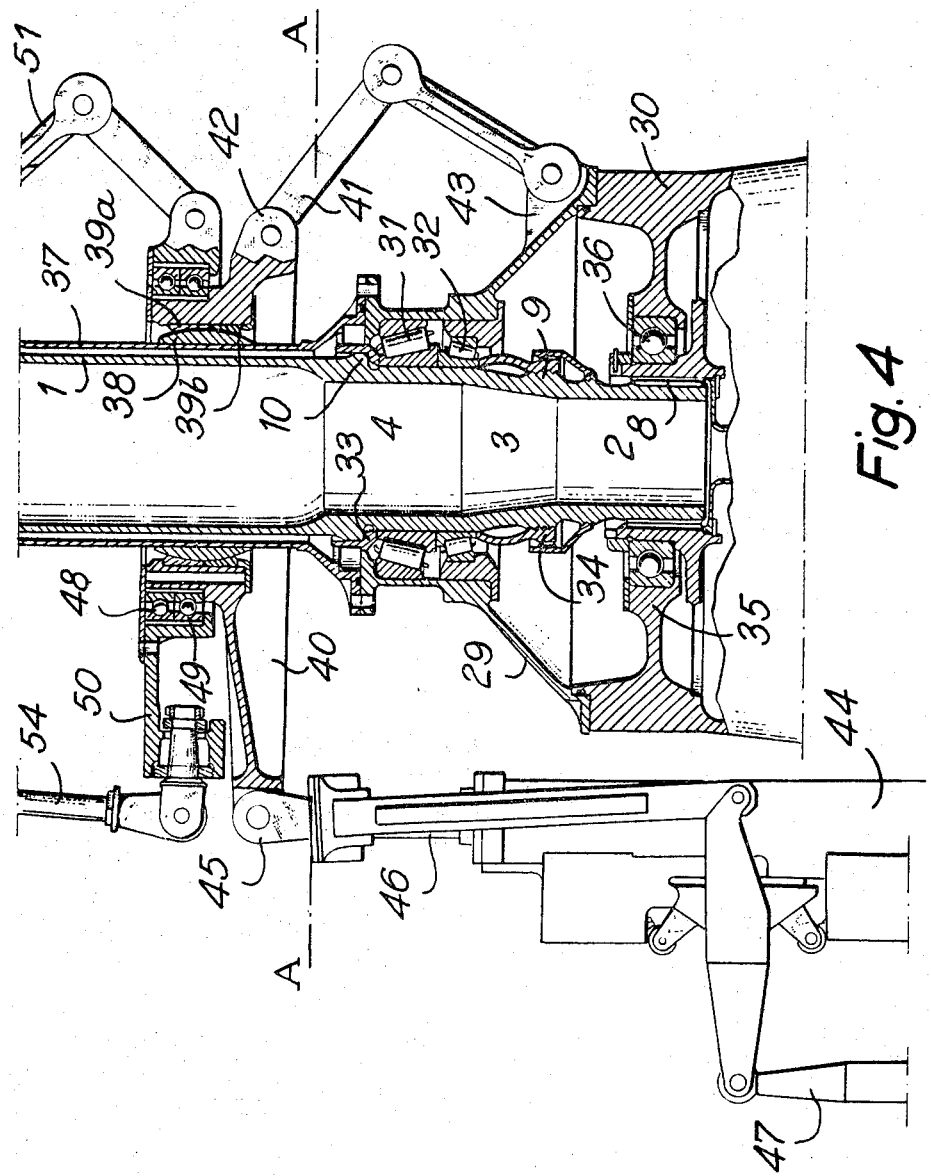
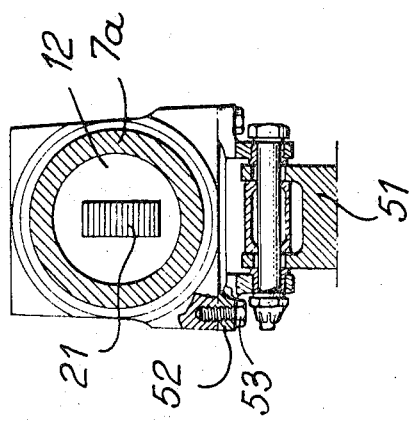
Fig. 4
Fig. 5

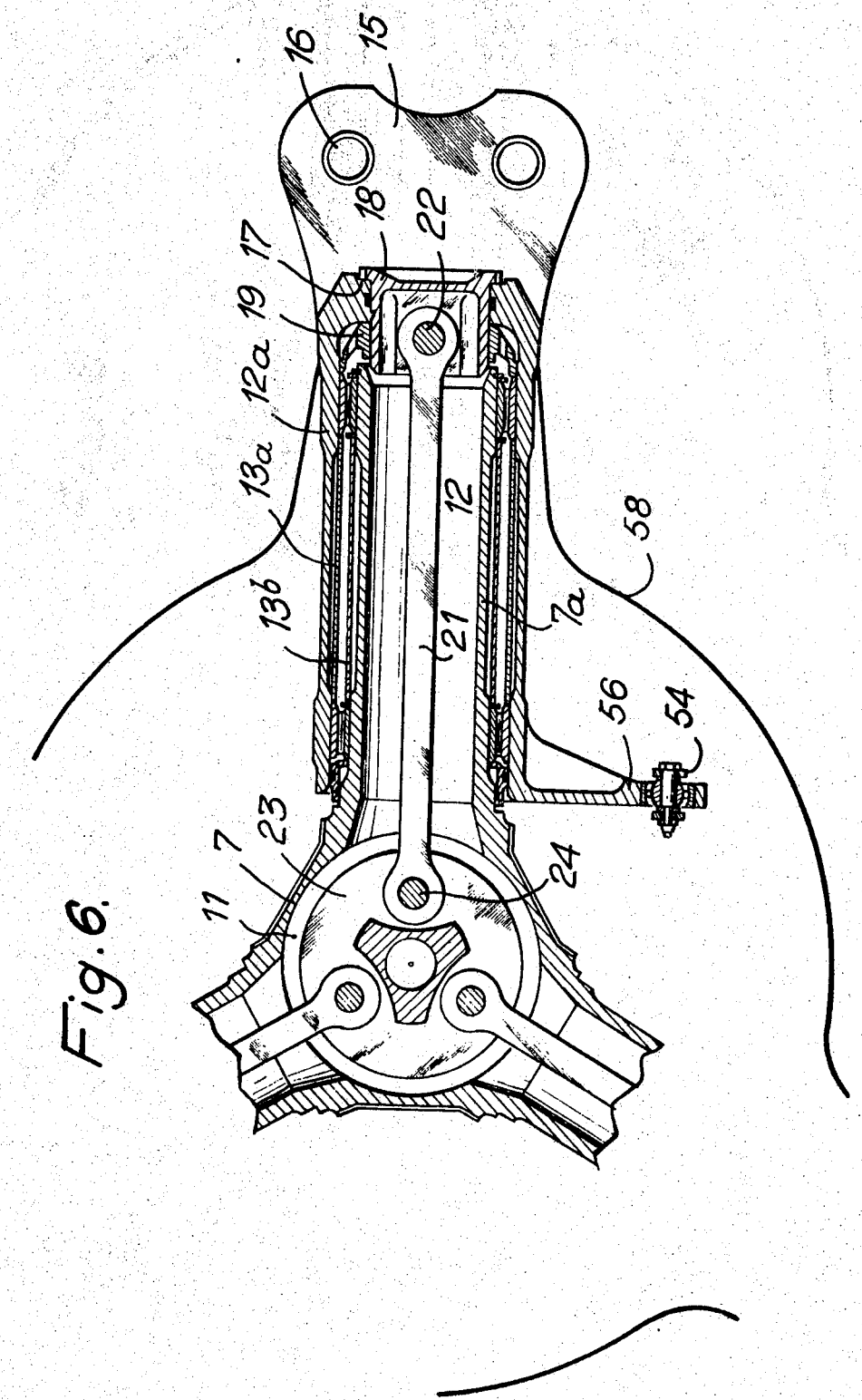

3,545,880
ROTOR FOR ROTARY-WING AIRCRAFT
René Louis Mouille, Aix-en-Provence, France, assignor to Sud-Aviation Societe Nationale de Constructions Aeronautiques, Paris, France
Filed July 23, 1968, Ser. No. 746,852
Claims priority, application France, July 31, 1967, 116,262
Int. Cl. B64c 27/48
U.S. Cl. 416—114                                5 Claims

ABSTRACT OF THE DISCLOSURE

A rotor for rotary-wing aircraft which is devoid of flapping and lead-lag hinges in the connection between the blades and the hub and in which are combined, with a hollow one-piece rotor mast forming at once a shaft, a hub and rotorblade supporting arms, an arrangement for mounting a rotor blade for free rotation and sliding on each arm and restraining means formed by a non-extensible but rotationally elastic attachment for the blade root to a central core housed in the upper flared portion of said mast.

SUMMARY OF THE INVENTION

In many existing designs, the rotors equipping rotary-wing aircraft comprise lead-lag, flapping and pitch-angle hinges. These designs, however, have the disadvantage of being mechanically complicated and hence costly; further, their maintenance involves frequent inspections and lubricating operations.

For this reason attempts have been made to eliminate the flapping and lead-lag hinges, and many known designs exist in which the elastic effects required for operation are obtained in the rotor blades themselves or by interposing flexible elements between the blades and the hub. Thus it is known to mount the rotor blades through the medium of sets of flexible spring blades which inter-connect each rotor-blade root with the hub, such flexible elements being if necessary housed within the rotor blades.

Further, the rotors are usually carried on masts which comprise a rotor shaft proper equipped with drive take-off means, means for suspending the aircraft and means for securing a rotor blade supporting hub, and such rotor hub is provided externally with arms perpendicular to the rotor shaft, there being as many arms as there are rotor blades. Despite their comparative simplicity, such arrangements involve the invariably delicate and costly manufacture of means for assembling the hub to the mast, resulting in a high production cost; they have the added disadvantage of resulting in assemblies which are heavy and therefore incompatible with the constant striving for increased lightness in aeronautical engineering. Lastly, experience has shown that incipient corrosion can occur at the shaft/hub connection, to the detriment of fatigue strength.

With a view to overcoming these drawbacks it has already been proposed to adopt a one-piece rotor mast consisting of a single hollow member which forms at once a shaft, a hub and an upper plate by virtue of its upwardly flared shape; said member being provided at its lower end with drive take-off means. Such a constructional mode was described in U.S. Pat. 3,322,200.

Lastly, it is also known to use a hollow rotor shaft which comprises rotor-blade supporting cylindrical arms at its top.

The present invention relates to an arrangement which overcomes the drawbacks of prior art systems and which enables the flapping and lead-lag hinges to be dispensed with, while at the same time relieving the hub of complex loads and permitting easy maintenance. To this end the invention includes, in a rotary-wing aircraft rotor, a combination of means for interconnecting a hollow one-piece rotor mast acting at once as a shaft, a hub and rotor-blade supporting arms with means for securing the rotor blades by mounting their roots for free rotation and by restraining them on the arms by tie means which are for all practical purposes inextensible in response to centrifugal force yet offer rotational elasticity, through the use of flexible spring blades in particular, and which interconnect each rotor-blade root to a central core housed in the flared upper portion of the mast.

In one particular form of embodiment, said rotor mast is a single hollow member whose upper portion is flared and includes a plurality of hollowed rotor blade supporting cylindrical arms arranged perpendicularly to the rotation axis of the mast, or with a slight degree of upward flare, the lower part of said member being extended, as well known per se, whereby to receive attachment means and power take-off means of the kind disclosed notably in the above-cited patent.

In an alternative embodiment, each rotor blade is mounted through the medium of a cylindrical member which forms a sleeve encasing an arm and sealingly mounted thereon for rotation thereabout while at the same time permitting slight sliding motion.

Such a sleeve receives rotor blade securing pins and is pivotally and slidably mounted on an associated cylindrical arm housing a non-extensible but torsionally flexible and elastic element preferably formed by stacked metal blades and connected on the one hand to said sleeve via a plug, and on the other hand (adjacent the rotor shaft) to a central core positioned inside the flared upper mast portion and designed to reciprocally absorb the centrifugal loads so as to retain the blades.

Each arm-sleeve assembly is made oiltight by means of interposed seals so as to permit lubrication of the hinge by an oil-bath preferably fed from a single reservoir located at the top of the mast and in which the oil level is visible.

The description which follows with reference to the accompanying non-limitative exemplary drawings will give a clear understanding of how the invention can be carried into practice.

BRIEF DESCRIPTION OF THE DRAWING

FIG. 1 shows a one-piece mast according to the invention in longitudinal section;

FIG. 2 is a section through the broken line II—II of FIG. 1, as viewed on the arrows;

FIG. 3 shows in longitudinal section a rotor head comprising such a mast, only the upper part of the latter being portrayed, whereas FIG. 4 shows the corresponding lower part, it being possible to join FIGS. 3 and 4 along the line A—A in FIG. 4;

FIG. 5 is a section on the line V—V of FIG. 3, as viewed on the arrows; and

FIG. 6 is a fragmental section taken through the line VI—VI of FIG. 3.

DETAILED DESCRIPTION

Figure 3:
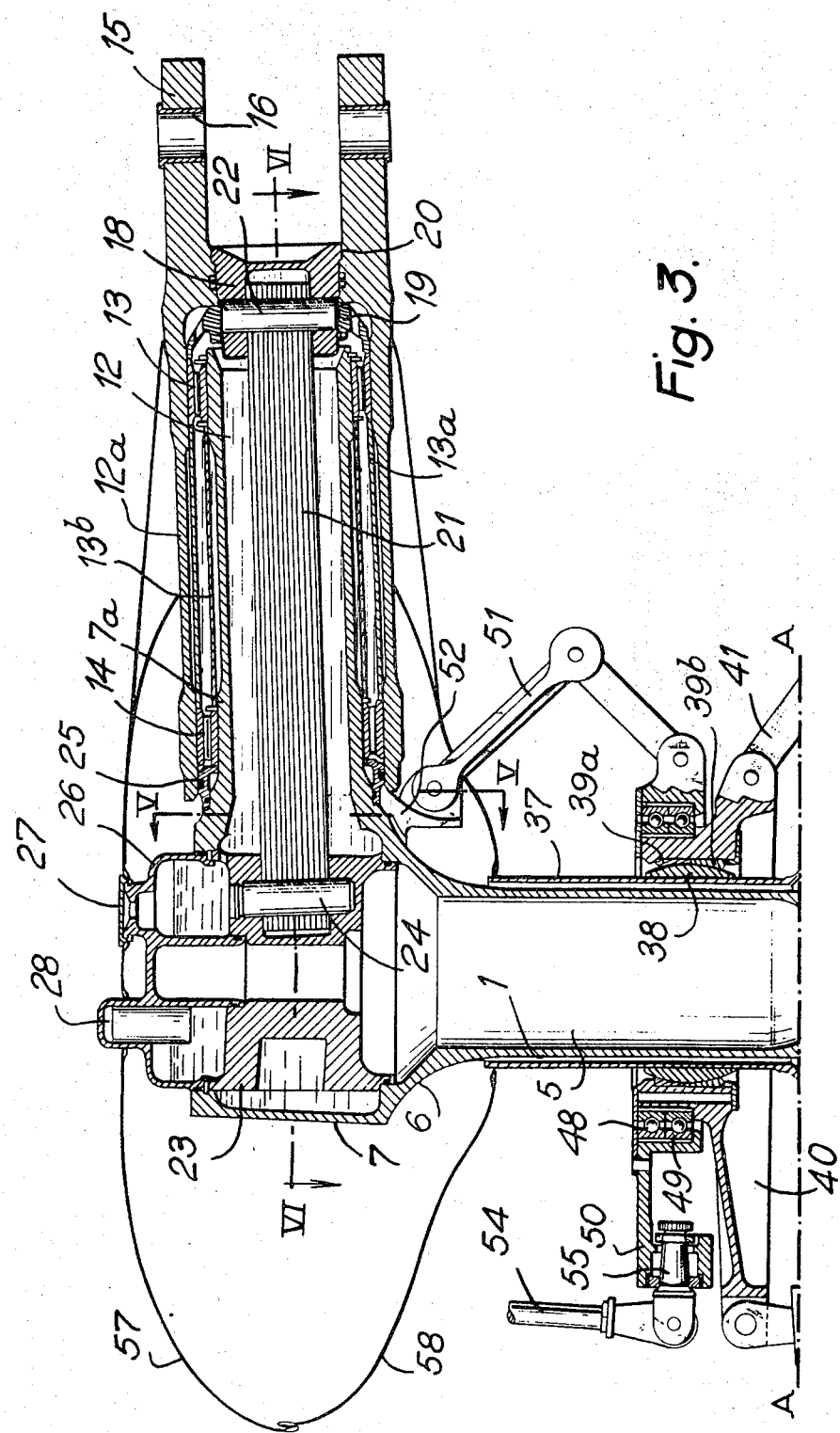

As is most clearly shown in FIGS. 1 and 2, the rotor mast shown in the drawings consists of a single hollow one-piece member 1 made of steel or titanium, for example, and comprising a lower portion divided into four stages 2 through 5, and intermediate upwardly flared transitional portion 6, and a drum-forming upper portion 7 to which are attached as many arms 7a as there are rotor blades.

Externally, stage 2 is provided with gear teeth 8 for transmitting the drive. Stage 3 is formed with an external screw-thread 9. Between stages 4 and 5 the mast is formed with a protruding circular ridge 10. Above the internal flared hollow part of stage 6, stage 7 is formed with an internal hollow 11 which communicates with internal hollows 12 of arms 7a.

The rotor mast devised as above is equipped with its associated component parts, which are visible on the subsequent figures.

As shown more clearly in FIG. 3, each arm 7a has pivotally and slidably mounted thereon an encasing rotor blade supporting sleeve 12a carried on two needle-bearings 13 and 14 separated by distance-pieces 13a and 13b and retained in position by an end distance piece 19. Sleeve 12a, which is made of steel or preferably of aluminum alloy, forms on its outer end a clevis 15 each prong of which is drilled with holes lined with bushes 16 adapted to receive the securing pins for a rotor blade (not shown).

As may be clearly seen in FIG. 6, sleeve 12a is formed at its outer end, internally of clevis 15, with a shoulder 17 intended to provide a thrust surface for a steel plug 18 which leaktightly traverses the axial outer opening of sleeve 12a.

In order to ensure angular rigidity of plug 18, its flange is formed with flats 20 which engage into corresponding lodgings in sleeve 12a between the prongs of clevis 15.

A torsionally flexible and elastic interconnecting system, consisting as shown of stacked metal blades 21 or of any other convenient arrangement, is interposed between sleeve 12a and a central steel core 23 positioned within drum 7. Each blade is formed with an eye at either end, one of which is first inserted into the hollow in plug 18 and is traversed by a pin 22 extending transversely therethrough and through corresponding holes in the plug. The other eye is inserted into a hollow of core 23 and is traversed by a pin 24 engaged into a blind hole in core 23, which hole is open upwardly and is formed with a groove for receiving a circlip or the like for restraining pin 24.

The end of sleeve 12a is associated to a seal 25 at the root end of arm 7a, and this mutual sliding and rotation accomodating seal, in conjunction with the static sealing function of plug 18, results in the arm and sleeve compound forming a chamber capable of being filled with lubricating oil, for instance from a central reservoir 26 inserted in oiltight static fashion, at the top of drum 7, into the inside surface of drum 7, in such manner as to register, by means of an internal skirt, with a central opening in core 23. Reservoir 26 is made of transparent plastic and includes a filling orifice fitted with an oiltight cap 27, and a dome for covering a float 28 which acts as a visible oil level beneath said dome.

The hub components are assembled in the following order:

(1) Fit into a sleeve 12a the end distance-piece 19, the outer race of outer needle-bearing 13, the distance-piece 13a and the outer race of inner needle-bearing 14.

(2) Assemble the stack of spring blades 21 and the plug 18 by means of pin 22.

(3) Fit the assembly consisting of blades 21, plug 18 and pin 22 into sleeve 12a, from the outer end thereof.

(4) Fit to each arm 7a the seal 25 and the inner races of bearings 13 and 14, with distance-piece 13b interposed therebetween and the needles restrained on said inner races.

(5) Fit central core 23, made oiltight by upper and lower seals placed in corresponding lodgings on drum 7 and core 23, the latter being left devoid of pins 24.

(6) Fit a sleeve 12a equipped with blades 21 over an arm 7a, the blades 21 extending through the hollow 12 with their inner ends engaging into the corresponding hollow in core 23.

(7) Fit a pin 24 and lock it in position.

The last two operations must be repeated for each arm 7a. The reservoir 26 is then placed in position and filled. The mast hereinabove described is mounted on a cover 29 (FIG. 4) on a main transmission box 30, through the medium of two superimposed thrust bearings 31 and 32 acting in opposite directions and the inner races of which are restrained on mast 1 by a ring 33 between ridge 10 and a nut 34 formed with a skirt and cooperating with screw-thread 9. Such an assembly securely retains the thrust bearings when the same are performing their functions of suspending the aircraft in flight or of supporting the rotor when the same is not producing lift.

The main transmission box is equipped with an output driving ring-gear 35 the inner gear teeth of which cooperate with the gear teeth 8 of the lower stage 2 of mast 1. This ring-gear and the associated mast stage are mounted in box 30 through the medium of a ball-bearing 36.

Mounted over cover 29 is a fixed cylindrical sleeve 37 upon which is slidably mounted a spherical ring 38 (FIG. 3) about which are oscillatable two rings 39a and 39b which have inner spherical surfaces and are rigidly connected to the nonrotating central portion 40 of a swashplate.

The non-rotating swashplate portion 40 is prevented from rotating by a caliper 41 which is connected at one end to portion 40 via a clevis 42 rigid therewith and at its other end to a lug 43 formed on cover 29. Swashplate portion 40 is supported and positioned by a system of three control jacks (only one being shown) the cylinders 44 of which are secured equidistantly to the casing of transmission box 30 and have the clevis 45 of their piston-rod ends 46 connected to non-rotating portion 40 by a pin-and-eye fastening system. Said jacks operate simultaneously or separately in response to links 47 which slide the swashplate along sleeve 37 and tilt it about spherical ring 38. Through the agency of ball-bearings 48 and 49, the portion 40 has mounted thereon a rotating swashplate portion 50 rotated by a caliper 51 which connects it to a supporting member 52 (FIGS. 3 and 5) secured by bolts 53 beneath the flared portion 6 of mast 1. The motions of swashplate rotating portion 50 are transmitted to each rotor-blade sleeve 12a in conventional manner by means of links 54 which, via ball-and-socket joints at each end, are connected on the one hand to journals 55 rigid with the portion 50 and on the other hand to levers 56 (FIG. 6) rigid with the lower ends of the associated sleeves 12a. In order to reduce drag, the entire rotor head assembly can readily be streamlined by means of a fairing consisting of two half-shells 57 and 58 shaped as shown in FIGS. 3 and 6 but of which the means for securing them together and to the mast are not shown.

In addition to the advantages stemming from elimination of the flapping and lead-lag hinges, the less complicated mechanical construction, the lower cost, and the easier maintenance, the system hereinbefore disclosed offers advantages accruing from a one-piece hollow mast. In particular, such a mast can be fabricated economically from a rough forging, almost entirely by operations performed on a lathe. In comparison with conventional designs, and for a given weight, it offers enhanced rigidity and improved fatigue strength. The arms 7a and their roots are the seat only of static and dynamic bending loads, to the exclusion of rotor-blade restraining centrifugal traction forces. Resistance to these bending forces is very favourably influenced by the gradual taper of the working sections, by the absence of sharp edges and by the very smooth surface which can be produced both inside and outside the member by virtue of its configuration and the excellent accessibility resulting therefrom.

Resistance to centrifugal loadings is provided reciprocally by the core 23, the blade stacks 21 and the plugs 18, by reason of the freedom to slide of sleeves 12a over needle-bearings 13 and 14 and the corresponding bearing surfaces within sleeves 12a and outside arms 7a.

Further, the fact that arms 7a are designed with slight upward flare means that during operation, with the rotor delivering lift sufficient to balance the weight of the aircraft, the rotor blades revolve substantially along the axes of arms 7a, thereby reducing the bending forces applied thereto. Lastly, the system hereinbefore disclosed offers the following complementary advantages:

A central oil-bath type lubrication system is provided by means of the reservoir 26 with its visible level monitored by float 28, without the need for interconnecting piping.

The rotor head is reduced in size and thereby facilitates fairing thereof.

The system can be adapted to any desired number of rotor blades.

It goes without saying that many changes and substitutions of parts may be made in the forms of embodiment described hereinabove without departing from the scope of the invention.

What I claim is:

1. In a rotary-wing aircraft rotor devoid of flapping and lead-lag hinges in the interconnection between rotor blades and hub, in combination, a one-piece hollow rotor mast having an upper flared portion, said mast including a shaft, and hub and rotor-blade supporting arms, a rotor-blade mounted freely rotatable and slidable on each arm, non-extensible but torsionally elastic means for fastening and restraining each rotor-blade root, and a central core housed in the upper flared portion of said mast, said elastic means for all the blades being attached to said core.

2. In a rotor as claimed in claim 1, non-extensible fastening means each formed by a stack of spring blades having an eye at each end, the eye at one end being attached to said central core by a retaining pin inserted through a blind hole provided in said core, and the eye at the other end being secured to a rotor-blade attachment sleeve by a pin extending through a plug member inserted into a housing in said rotor-blade attachment sleeve and made angularly rigid with said housing.

3. In a rotor as claimed in claim 2, a rotor blade attachment sleeve mounted rotatably and slidably on the associated hub arm through the medium of needle-bearings spaced by distance-pieces, said sleeve encasing said arm.

4. In a rotor as claimed in claim 3, oiltight means between said plug members and said sleeves and between said core and said mast, slidable oiltight means between the ends of said sleeves and the roots of said arms, and an oil reservoir with a visible level and oiltight seals between the wall of said reservoir, the open upper portion of said mast, and said core.

5. In a rotor as claimed in claim 1, attachment means at each root for a caliper member for rotating a rotatable swashplate portion, and interconnection by means of ball-and-socket joints and links between levers rigid with the inner ends of said sleeves and said rotatable swashplate portion.

References Cited

UNITED STATES PATENTS

| | | | |
|---|---|---|---|
| 2,810,443 | 10/1957 | Doman | 170—160.26 |
| 2,919,758 | 1/1960 | Hook | 170—160.25 |
| 2,961,051 | 11/1960 | Wilford et al. | 170—160.54X |
| 3,026,942 | 3/1962 | Cresap | 170—160.53X |
| 3,254,724 | 6/1966 | Brooke | 170—160.53X |
| 3,297,094 | 1/1967 | Kisovec | 170—160.53X |
| 3,310,119 | 3/1967 | Watson | 170—160.53 |

FOREIGN PATENTS

| | | | |
|---|---|---|---|
| 247,938 | 7/1926 | Great Britain | 170—160.23 |
| 751,109 | 6/1958 | Great Britain | 170—160.25 |

EVERETTE A. POWELL, Jr., Primary Examiner

U.S. Cl. X.R.

416—136, 244